(12) United States Patent
Blanding et al.

(10) Patent No.: US 7,779,406 B2
(45) Date of Patent: Aug. 17, 2010

(54) METHOD AND SYSTEM FOR MANAGING LIFECYCLES OF DEPLOYED APPLICATIONS

(75) Inventors: Stephen M. Blanding, Redmond, WA (US); Michael J. Cherry, Redmont, WA (US); David E. Kays, Jr., Bellevue, WA (US); James S. Masson, Bothell, WA (US); Debi P. Mishra, Hyderabad (IN); Daniel Plastina, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 930 days.

(21) Appl. No.: 11/441,746

(22) Filed: May 26, 2006

(65) Prior Publication Data

US 2006/0265708 A1    Nov. 23, 2006

Related U.S. Application Data

(63) Continuation of application No. 09/293,326, filed on Apr. 16, 1999.

(51) Int. Cl.
 *G06F 9/445* (2006.01)
(52) U.S. Cl. ........................... 717/172; 717/177
(58) Field of Classification Search .................. None
See application file for complete search history.

(56) References Cited

U.S. PATENT DOCUMENTS

| | | | |
|---|---|---|---|
| 5,506,988 A | 4/1996 | Weber et al. | 718/103 |
| 5,742,829 A | 4/1998 | Davis et al. | 717/170 |
| 5,867,713 A | 2/1999 | Shrader et al. | 717/176 |
| 5,933,646 A | 8/1999 | Hendrickson et al. | 717/169 |
| 5,953,532 A | 9/1999 | Lochbaum | 717/176 |
| 6,141,686 A | 10/2000 | Jackowski et al. | 709/224 |
| 6,282,712 B1 | 8/2001 | Davis et al. | 717/170 |
| 6,289,510 B1 | 9/2001 | Nakajima | 717/170 |
| 6,353,926 B1 | 3/2002 | Parthesarathy et al. | 717/173 |
| 6,389,589 B1 * | 5/2002 | Mishra et al. | 717/170 |
| 6,401,238 B1 | 6/2002 | Brown et al. | 717/178 |
| 6,418,554 B1 * | 7/2002 | Delo et al. | 717/174 |
| 6,466,932 B1 | 10/2002 | Dennis et al. | 707/3 |

OTHER PUBLICATIONS

Office Action dated Jul. 17, 2002 cited in U.S. Appl. No. 09/293,326.

(Continued)

*Primary Examiner*—Chuck O Kendall
(74) *Attorney, Agent, or Firm*—Workman Nydegger (57) ABSTRACT

Described is managing the changing of software implementations such as applications deployed to enterprise client users or machines. Precedence relationships between deployed applications are specified. To determine which applications to install for a given client, the precedence is applied to the subset of applications assigned or published to the client. At logon or machine reboot, an upgrade process evaluates the deployed applications and any upgrade relationships, setting applications for removal or installation. A user may also install an application that has been designated as optional. Also described is an application lifecycle model for replacing applications. For example, administrators can phase in upgrades as a pilot to a small group of users, roll out upgrades to a larger group, and then provide the application to all users. Upgrades may be mandatory or optional, and replaced programs may be removed and then replaced, or overlaid during installation.

17 Claims, 10 Drawing Sheets

OTHER PUBLICATIONS

Office Action dated Apr. 9, 2003 cited in U.S. Appl. No. 09/293,326.
Office Action dated Dec. 30, 2003 cited in U.S. Appl. No. 09/293,326.
Office Action dated Oct. 21, 2004 cited in U.S. Appl. No. 09/293,326.
Office Action dated Jul. 27, 2005 cited in U.S. Appl. No. 09/293,326.
Office Action dated Feb. 28, 2006 cited in U.S. Appl. No. 09/293,326.

* cited by examiner

METHOD AND SYSTEM FOR MANAGING LIFECYCLES OF DEPLOYED APPLICATIONS

CROSS-REFERENCE TO RELATED APPLICATION

This application is a continuation of copending U.S. patent application Ser. No. 09/293,326, filed Apr. 16, 1999.

FIELD OF THE INVENTION

The invention relates generally to computer systems and application programs, and more particularly to the deployment of application programs across a network of computers.

BACKGROUND OF THE INVENTION

Centralized application deployment in computer networks, such as provided in Windows® 2000 Server, enables administrators to specify which application programs client users and machines will have in accordance with a policy. More particularly, at the time of user logon, machine startup and/or connection to the network, and/or periodically while the machine is connected, a list of applications that are to apply to the user or machine is processed. The list is dynamically evaluated against the state of the machine, e.g., at the time of user logon or machine connection, to establish which applications are available to the user based on the user's credentials and to the machine based on its identity. Then, a process takes the actions necessary to match the client to the list. Such state-based application deployment provides administrators with a great deal of centralized control of an enterprise's computing resources.

However, while this works well in a static environment, in typical enterprises, the applications assigned to users and machines often change. For example, the set of deployed applications is dynamic as new applications and alternative (e.g., upgraded) versions of existing applications are regularly being introduced. At the same time, administrators working independently from one another determine which applications a given machine or user will have. This may lead to a client having application programs that are mutually exclusive with one another from the enterprise's perspective, e.g., two spreadsheet application programs or versions are available, even though both should not be installed at the same time. The possible permutations for an enterprise are numerous and continuously evolving, for example, whether users should have one word processing application, two word processing applications, or both, along with which version. Another consideration is whether users should be forced to use one application or version thereof, or another, or whether the user has an option to choose. Making custom modifications for each user each time the user wants to make an optional change is impractical in large enterprises.

Moreover, at times, administrators may not want to make a drastic change to the applications that are deployed, but rather would like to implement a change slowly, such as only to a small group of users initially. In that way, any problems that arise are isolated during a trial period. Then, after the smaller test corrects any problems, or shows that the problems are acceptable, the application is rolled out to a larger group. If the application is acceptable after testing on the larger group, the application is deployed to the entire enterprise. Again, in each scenario, the change may be forced or optional for a period of time.

In sum, applications may be deployed across a network in numerous ways. The manual method of configuring each computer for a given user or machine is burdensome and inadequate for larger networks. However, state-based deployment has heretofore not provided an adequate way to determine which application should apply to a user in the event that one or more similar applications apply.

SUMMARY OF THE INVENTION

Briefly, the present invention provides a system and method for managing the lifecycles of applications used in an enterprise, by setting precedence relationships among applications deployed in a network to determine a set of applications to apply to each client user or machine. Information indicative of precedence relationships between applications is specified and maintained at a network location, and an application to potentially deploy, such as during user logon, is selected. A determination is made as to whether the application has precedence over another application, and if so, the selected application is set for deployment while the other application is deselected.

The method and system facilitate the use of application lifecycles, a model for replacing applications with either new or updated applications. To this end, upgrades may be optional or mandatory, provided first as a pilot to a small group of users, rolled out to a larger group, and/or then provided to all users. The application programs that are replaced may be removed and then replaced, or overlaid by installing the new application over the old. Other applications may simply be removed without replacing, while others may be allowed to optionally remain but be non-supported.

Other advantages will become apparent from the following detailed description when taken in conjunction with the drawings, in which:

DETAILED DESCRIPTION OF THE PREFERRED EMBODIMENT

Exemplary Operating Environment

Figure 1:
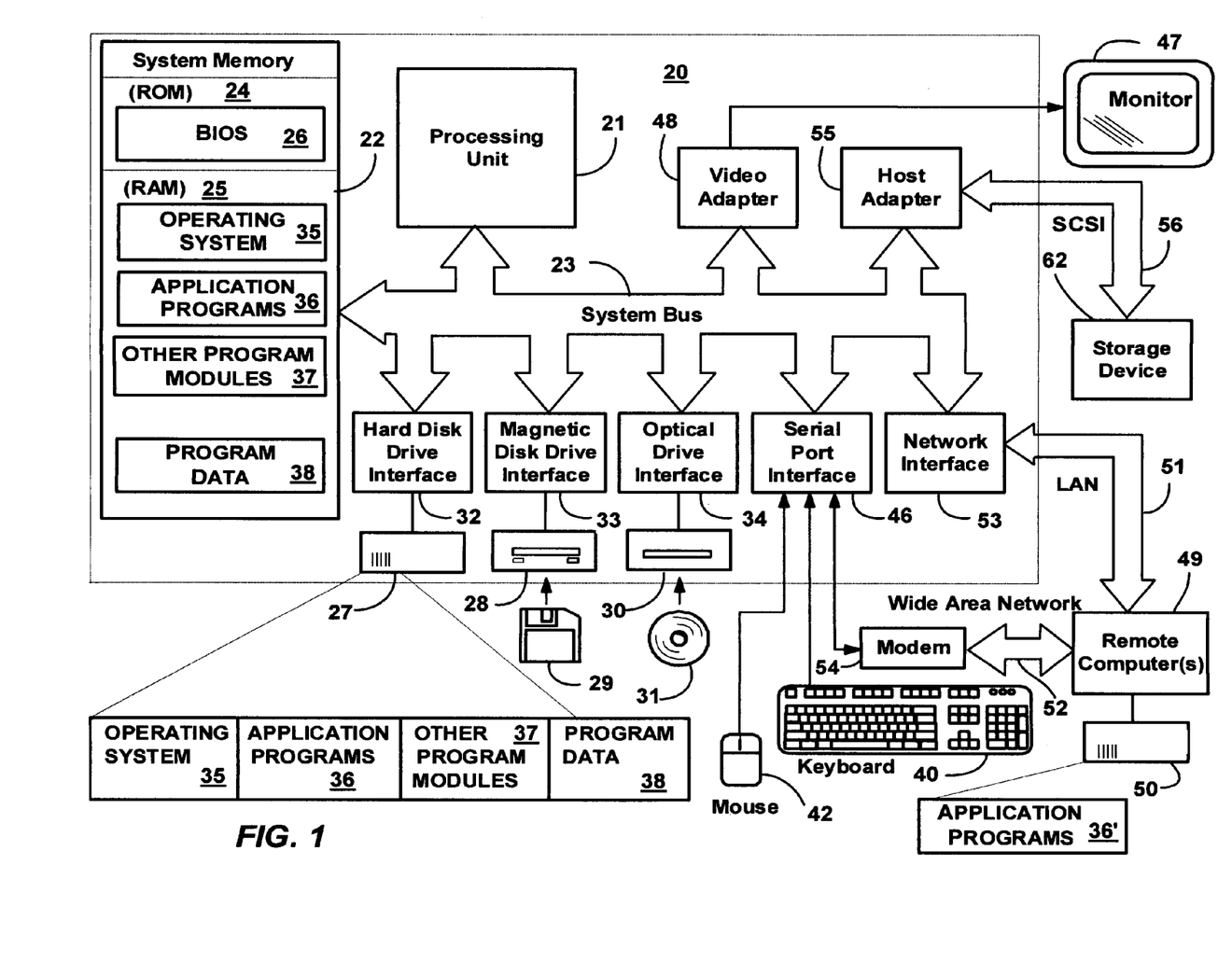
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows® 2000), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
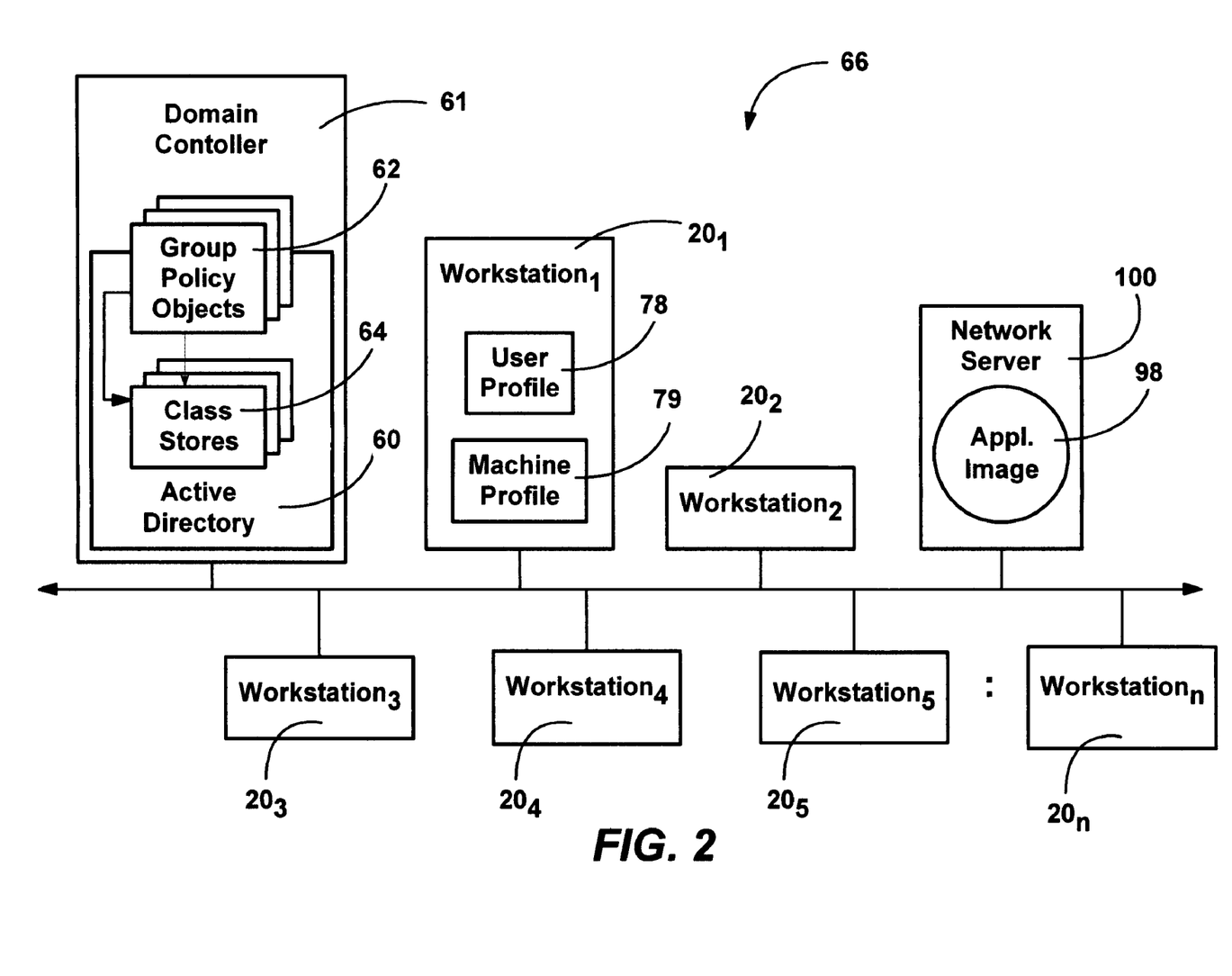
FIG. 2 is a block diagram representing various components for centralized application deployment in a network and for managing relationships among deployed applications in accordance with one aspect of the present invention.

The present invention is described herein with reference to the Microsoft® Windows® 2000 operating system, and in particular to the flexible hierarchical structure of sites, domains and/or organizational units of a Windows® 2000 Active Directory 60 of a domain controller 61 (FIG. 2). Notwithstanding, there is no intention to limit the present invention to Windows® 2000 (formerly Windows NT®) or the Active Directory 60, but on the contrary, the present invention is intended to operate with and provide benefits with any operating system, architecture and/or mechanisms that utilize network information.

Application Deployment

Turning to FIG. 2, in general, application deployment involves initially making an application available to network policy recipients via group policy objects 62. To this end, an administrator tailors policy objects 62 to sites, domains, and/or organizational units of users and computers thereunder, (in a hierarchical manner), by specifying one or more group policies 62 therefor, such that the policy within an organization is centrally managed. Such group policies 62, including the prioritizing of multiple policies 62 for policy recipients (e.g., users or machines) are described in U.S. patent application Ser. No. 09/134,805, entitled "System and Method for Implementing Group Policy," assigned to the assignee of the present invention and hereby incorporated by reference herein in its entirety.

A significant policy consideration that may be implemented under a group policy 62 is the management of applications. If application management is set up for a group policy object 62, a class store 64 is created thereunder, essentially to store the state of deployment of managed applications. More particularly, the first time the policy administrator attempts to deploy an application under the group policy object 62, a class store 64 is created, and thus the existence of a class store 64 in a group policy object 62 indicates that application management is in effect for this group policy 62. In a preferred embodiment, the class store 64 uses the Windows® 2000 Active Directory 60 as its centralized store and ties into the administrative hierarchy defined thereby, i.e., the class store is a container object (objectClass=ClassStore) in the Active Directory 60. Note that although separately shown in FIG. 2 for purposes of simplicity, a class store 64 is actually a subcontainer of the group policy container 62, as described in more detail in U.S. Pat. No. 6,389,589 entitled "Class Store Schema," assigned to the same assignee as the present invention, and hereby incorporated by reference herein in its entirety.

The class store 64 is the component that provides the framework for deploying application resources in the Active Directory 60 and making the deployment policy available to policy recipients (i.e., users and machines) via group policy objects. In this manner, applications and/or components in a class store are available as needed, while updates to components and/or applications may be performed once in a centralized location. For example, in accordance with a policy set by an administrator, and as described in detail below, users may automatically obtain new versions of applications and components as they become available. Access and administration privileges are controlled by standard access control properties on the class store container object 64.

Figure 3:
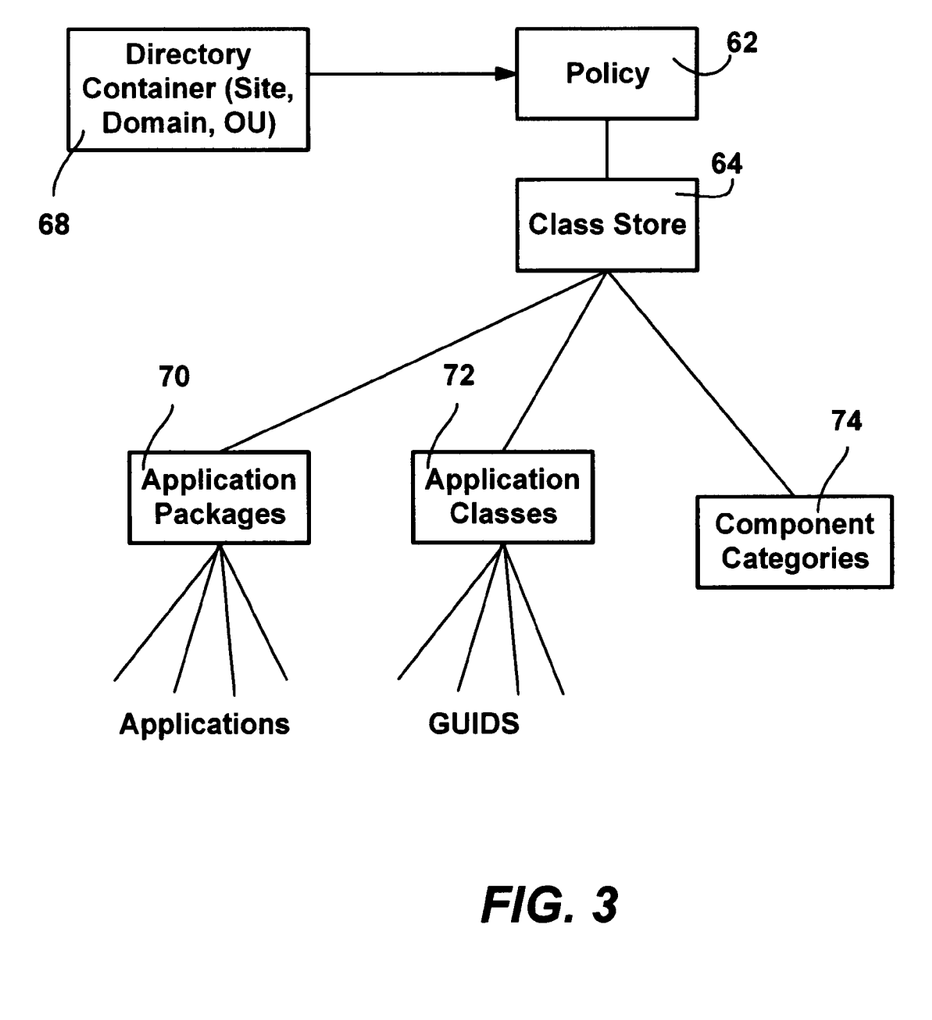
FIG. 3 is a representation of a policy and class store architecture for centralized application deployment.

FIG. 3 shows a directory container 68 and associated group policy object 62 having various containers under a class store 64, including an application package container 70, object class container 72 and component categories container 74. The Class Store object 64 is the top-level container of a Class Store hierarchy. Applications and components are generically referred to as packages, and as shown in FIG. 3, are stored and cataloged under the class store 64. Packages may be available from various vendors for different platforms, activation modes, access control, setup, and installation information. For example, a package may include an entire application (e.g., Microsoft® Word or Excel), a set of binary component implementations packaged together, or a standalone COM component (e.g., an ActiveX™ control).

The class store 64 may include a variety of properties and relationships for each of its various application packages. In general, these include the deployment state of the application, global details such as deployment name, publisher of the application, version, and a source for additional information. Also included is installation specific information, used for causing the application to be partially or fully installed on a desktop, activation specific information, used for finding the correct application to launch for an OLE or Shell activation, including, ClassID, File Extension and ProgID associations of the application. Platform specific information is also included, providing information on which hardware architecture and what operating system (and versions thereof) are required to run the application, along with specifying a set of supported languages. Moreover, in accordance with one aspect of the present invention and as described in more detail below, upgrade relationships with other applications may be included.

The class store 64 and the containers 70, 72 and 74 thereunder thus provide the information for deploying applications in a network. In particular, two mechanisms for deploying applications are supported, referred to as Assigning and Publishing, as described in U.S. Pat. No. 6,836,794 entitled "Method and System for Assigning and Publishing Applications" and U.S. Pat. No. 6,345,386 entitled "Method and System for Advertising Applications," assigned to the Assignee of the present invention, and hereby incorporated by reference herein in their entireties. An application typically is assigned to a group of users (or a group of machines) when it is deemed mandatory for that group to have that application, while published applications are those that are made optionally available to users who may benefit therefrom. For example, the same version of an electronic mail application program may be assigned to everyone in an organization, while a word processing program may be assigned to every group of users that needs some word processing capabilities. However, an application program for editing images may not be needed by everyone, and thus such a program may be published on a per-group basis so that those groups of users who may benefit from the program have it, while others who do not need it will not have it occupy resources of their workstations.

Figure 4:
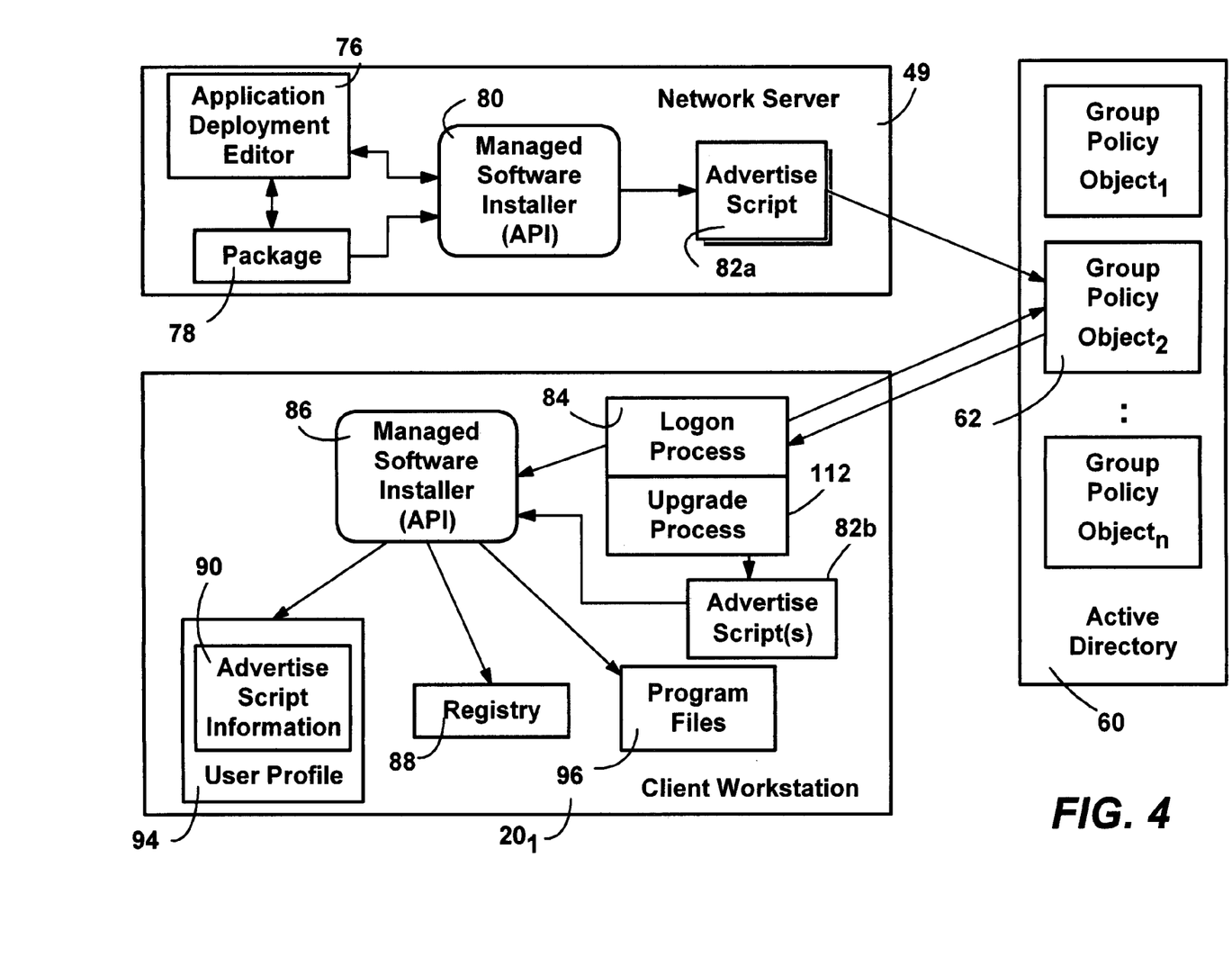
FIG. 4 is a block diagram generally representing exemplary components for state based deployment including upgrading and on-demand installation of applications in accordance with one aspect of the present invention.

Thus, an assigned application is an application that is explicitly made available to users in a group or organizational unit into which it has been deployed, and the user is not required to perform any special action to get an assigned application. To this end, as shown in FIG. 4, using an application deployment editor 76, (sometimes referred to as the Software Installation Snap-in), an administrator selects a package 78 to assign to a group, and via an API 80, generates at least one advertise script 82a therefor and writes it to a group policy object 60. At user logon, as part of a logon process 84, one or more group policy objects 62 are ordinarily applied to the user that is logging on, which includes executing at least one advertise script copy 82b therefor. Executing the advertising script 82b (via an API 86) makes the application appear to be available to the user, including writing information to the system registry 88 and adding script information such as shortcuts to assigned programs to the user profile 90 (e.g., the Start menu or desktop) on the workstation (e.g., 20$_1$).

Assigned applications are thus advertised, i.e., they appear as available to a user at each logon (if assigned to a user) or at each re-boot (if assigned to a machine). Note that advertised applications are not necessarily installed on the workstation 20$_1$, but rather may only appear to be installed. To make an application appear installed, advertisements for an application include shortcuts that appear on the Start menu, a collection of registry 88 entries required primarily for OLE and shell activation, and icon files. For example, to explicitly launch an application, users navigate the Start menu looking for a shortcut representing the application, then click that shortcut. Users also implicitly launch applications by double-clicking a file (of a file system) having an extension associated with a particular application. If not already installed, assigned applications are automatically installed in response to file activation and other types of activation.

Assigned applications are also resilient, in that they will be re-advertised on the next logon (or machine re-boot as appropriate) if deleted from the local workstation (machine) 20$_1$. To this end, the advertise script 82b for the user is reapplied at each logon (or another script for the machine at reboot), whereby the policy-specified applications for that user (or machine) are advertised on the workstation $20_1$. Moreover, even if a user installs another program or different version of the application over an assigned application, because the advertise script 82b is reapplied, the assigned application (the administrator-specified version) will return at the next logon (or reboot, if assigned to the machine). Only an administrator (and in particular a domain administrator) may permanently remove an assigned application, by doing so via the centralized location.

Alternatively, a published application is an application that is available to users in a group or organizational unit into which it has been published, however unlike assigned applications, published applications do not appear installed on a desktop. For example, the administrative action of publishing an application does not make a reference to that application appear in a user's Start menu. In general, a published application has no presence on a user's machine until the published application is automatically or manually installed on a desktop, i.e., the application becomes assigned to the user's profile. More particularly, published applications (those set for auto-install) are automatically assigned to a user's profile when activated by clicking on a file with an associated file extension or via ClassID activations. Moreover, a user may manually install a published application such as via an "Add/Remove Programs" applet dialog box or the like. Once a published application is installed, the user sees the application as if it was previously assigned, however, unlike an assigned application, if the published application is removed, it will not be present at the next user logon.

Once advertised, the applications may be installed on the local workstation 20, by the managed software installer mechanism 86 (sometimes referred to as the Windows® Installer) on an as-needed basis in the file system, e.g., as Program Files 96 (FIG. 4), the place where the actual application files are stored. For example, the first time that a user activates such an application (e.g., via the Start menu), the managed software installer mechanism 86 looks for it on the local machine but does not find it, after which the managed software installer mechanism installs the application from an application image 98 (FIG. 2) on a network server 100. Thereafter, the application remains on the local workstation 20, and need not be re-installed, unless deleted in some manner. However, even if deleted, the assigned application will be re-advertised the next time policy 62 is applied, e.g., at the next user logon, whereby if again activated, the advertised application will again be re-installed. In this manner, applications are automatically deployed in accordance with a policy, but for purposes of efficiency, initially may be only advertised rather than installed. As can be readily appreciated, installing programs only if and when activated provides substantial benefits, including efficient use of workstation resources, rapid user-logon, and balancing of the load on the network servers. The on-demand installation of software implementations including applications (e.g., features, components and files) is described in U.S. Pat. No. 6,523,166 entitled "Method and System for On-Demand Installation of Software Implementations" and U.S. Pat. No. 6,418,554 entitled "Software Implementation Installer Mechanism," assigned to the same assignee as the present invention and hereby incorporated by reference herein in their entireties.

Relationships Between Deployed Applications

In general, the present invention provides a method and system for managing the relationships between deployed software implementations (e.g., applications and operating systems), and in particular, the precedence relationships therebetween. For example, the present invention may be used to deploy new software implementations, upgrade existing software implementations, remove software implementations, and so forth. Thus, the present invention applies to software in general, however, for purposes of simplicity herein, the present invention will be primarily described with reference to relationships of application programs. Notwithstanding, the present invention is applicable to virtually any type of software implementation, including applications and operating systems.

An administrator specifies precedence relationships between any desired applications deployed in the enterprise. As described below, this precedence is applied to the subset of applications that may apply to a given user or computer, to determine the actual set of applications that should be installed. The actual set is then compared against the list of applications already installed, and any required installation is performed.

Figure 5:
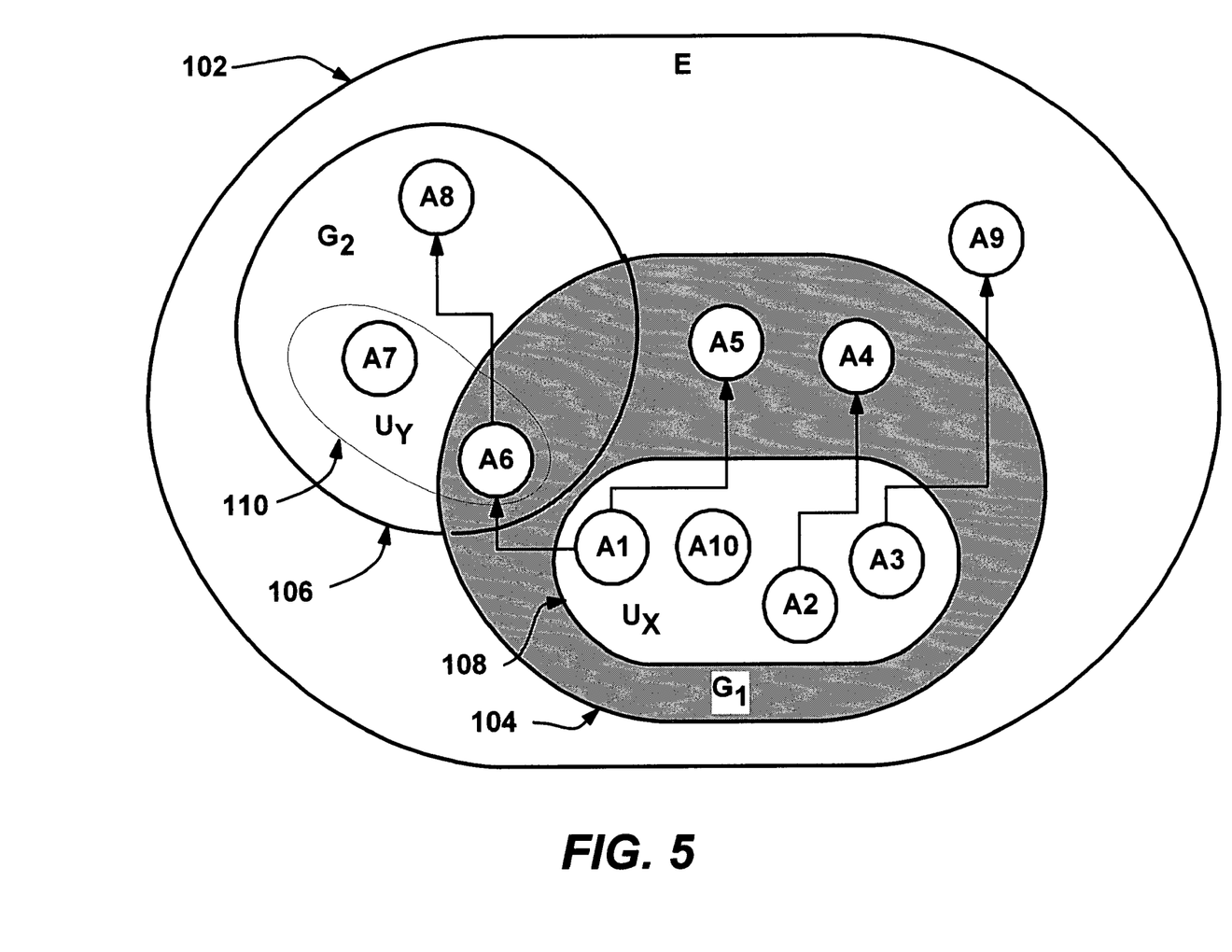
FIG. 5 is a representation of the set of applications in an enterprise and subsets thereof available to users, along with upgrade relationships therebetween.

FIG. 5 represents the set of applications 102 available in an enterprise E, while subsets 104, 106 represent the applications made available by one or more group policies 62 to two groups of users, $G_1$ and $G_2$, respectively. The subsets 108, 110 represent the applications that are actually installed on two users' machines, $U_X$ and $U_Y$, respectively. Also, in FIG. 5, the arrows represent the upgrade relationships between applications, e.g., A1 is an upgrade to A5 and A6, (note that A6 is an upgrade to A8), A2 is an upgrade to A4 and so on. Note that A3 is installed on the machine of the user $U_X$ and is an upgrade to A9, even though A9 itself is not available to the user.

Figure 6:
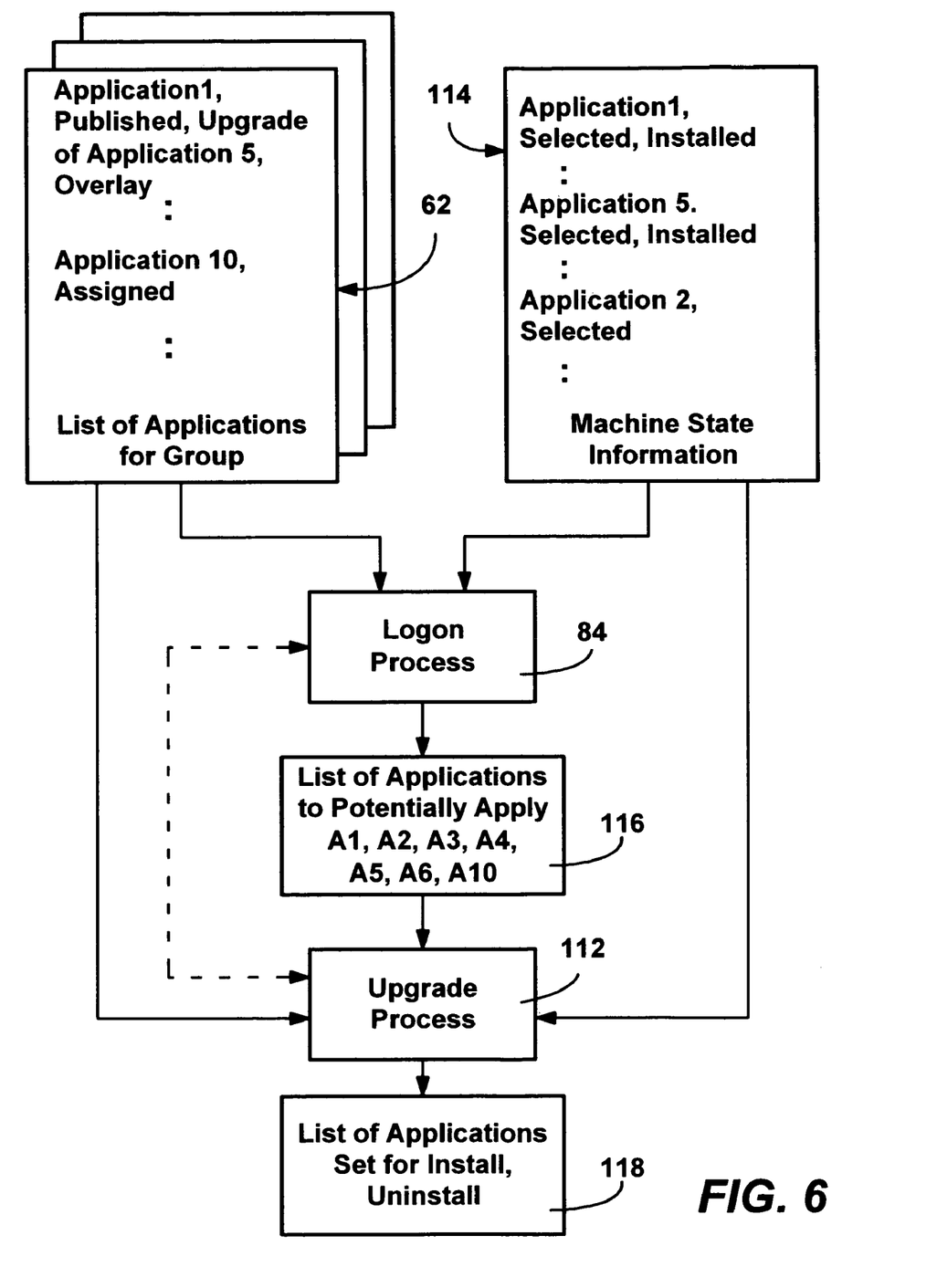
FIG. 6 is a block diagram representing various components for upgrading applications based on policy settings and the state of the machine in accordance with one aspect of the present invention.

FIG. 6 shows how the logon process 84, along with an upgrade process 112, (which may be part of the logon process 84 or a separate component therefrom), generally operates to apply the correct applications to a user's machine. As described in more detail below, the logon process 84 evaluates the group policy or policies 62 that apply to the user, and compares the list of applications therein against the state information 114 of the user's machine. The effective result is a list of applications 116 that are potentially available to the user. However, rather than advertise these applications to the user, the upgrade process 112 first goes through the list 116, and based on upgrade precedence information stored with the applications' properties in the class store 64, determines whether to set the applications for install and/or uninstall.

For example, as shown in FIG. 5, A1 is an upgrade to A5. If A1 is to be presently upgraded, e.g., the upgrade is mandatory, A5 effectively will be removed, e.g., not marked so as to "apply" from the list of applications to apply. Moreover, if A5 is installed on the machine, it will be overlaid by A1 rather than separately uninstalled, due to the upgrade/overlay property setting on A1. More particularly, certain upgrade applications are capable of properly overwriting the application or applications being upgraded, (e.g., writing over some files and/or deleting others), such as when both are written by the same manufacturer and the upgraded application is a recognized version. However, the upgrade application may not be able to (or know if it is able to) properly overwrite other applications, whereby those applications should be removed before replacing, sometimes referred to as a "rip and replace" operation. The property setting, either "overlay" or "replace" instructs the upgrade process on which way the install/uninstall should proceed. In the present example as represented in FIG. 6, A1 is set for install, which will overlay A5. Conversely, had A1 had the "replace" property value with respect to A5, A1 would be set for install while A5 would be set for uninstall.

Figure 7:
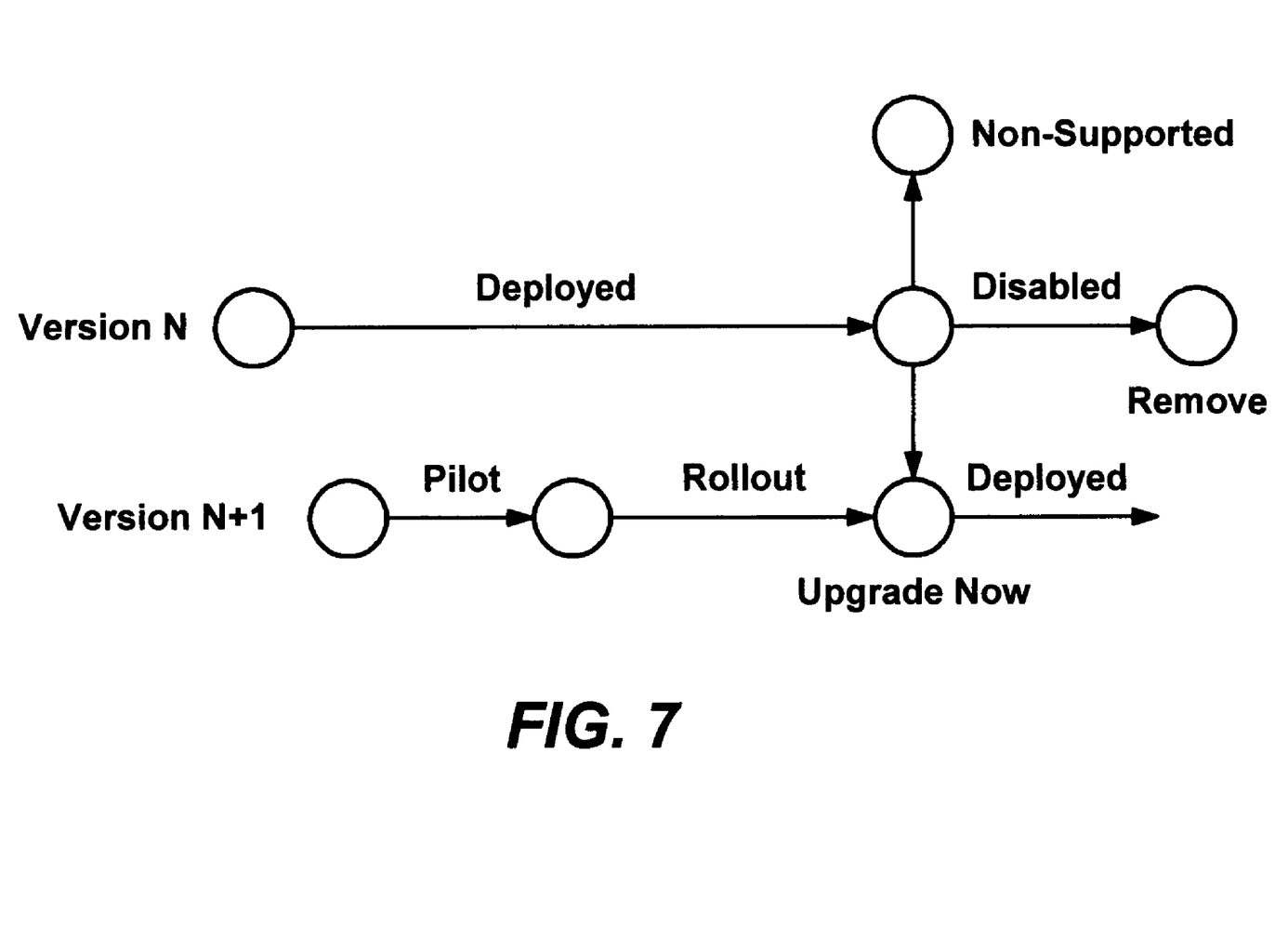
FIG. 7 is a diagram representing a lifecycle of a typical deployed application program in accordance with one aspect of the present invention.

FIG. 7 shows a model of a typical application lifecycle, beginning with the state where a version N of an application is deployed. At some time later, version N+1 is obtained by the enterprise, as an update to or a replacement for version N. At first, the enterprise deems it desirable to make version N+1 available to only a subset of version N users, ordinarily to test out the application's effects on the environment, referred to herein as a pilot stage. As testing proceeds, (assuming no major problems are encountered), the set of users that version N is available to may be increased, referred to in FIG. 7 as the rollout stage. Eventually, it is deemed desirable to make the version N+1 the default application, whereby essentially all new users will get version N+1 instead of the older version N. Version N may then be retired from service, which is accomplished in one of three ways. A first way is to force the upgrade to version N+1 by making it mandatory for all appropriate users (until that time, it had been optional). An alternative way is to disable the application, followed by its removal. In this scenario, existing users of version N may continue using it, however no new users will be permitted to use it. Eventually, version N is completely removed from management, i.e., non-supported. Third, a forced removal may be designated. In a force removal scenario, all users of version N are forced to stop using it. The users may optionally use version N+1, or they can use no version at all. Property values set on the application determine which upgrade scenario will take place for a given group.

Figure 8:
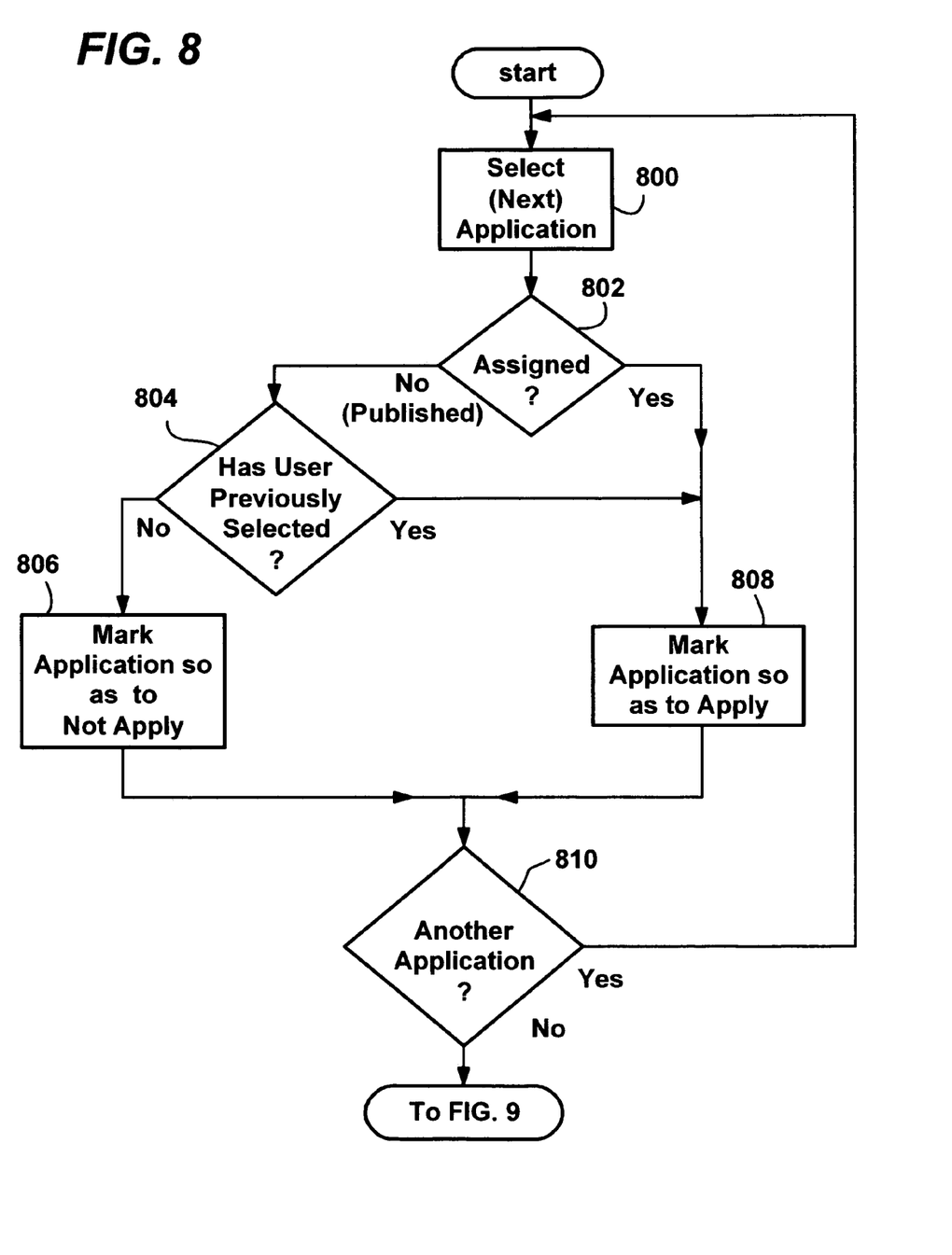
FIGS. 8-10 comprise a flow diagram generally representing the steps taken to upgrade application programs in accordance with one aspect of the present invention.
Figure 9:
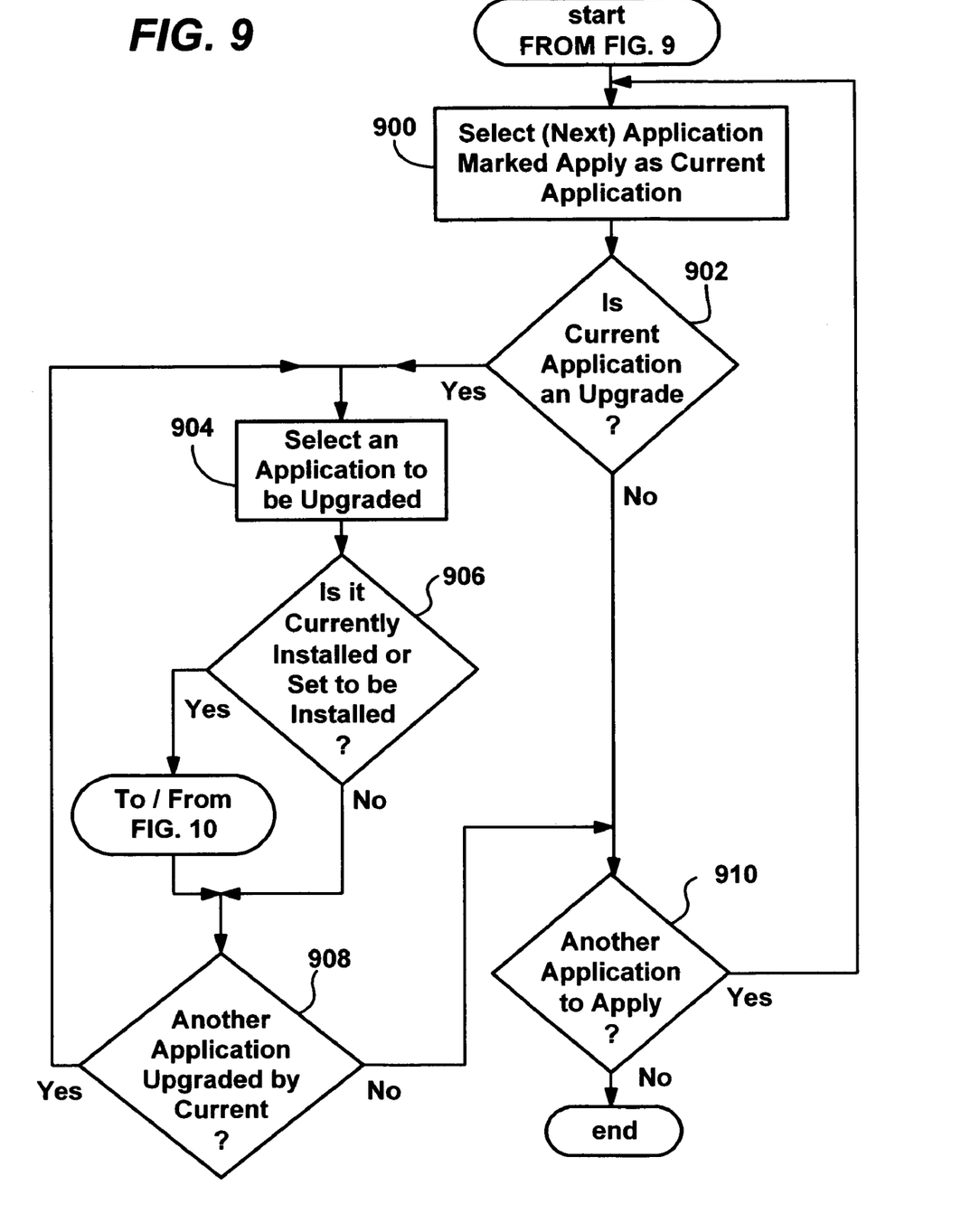
Figure 10:
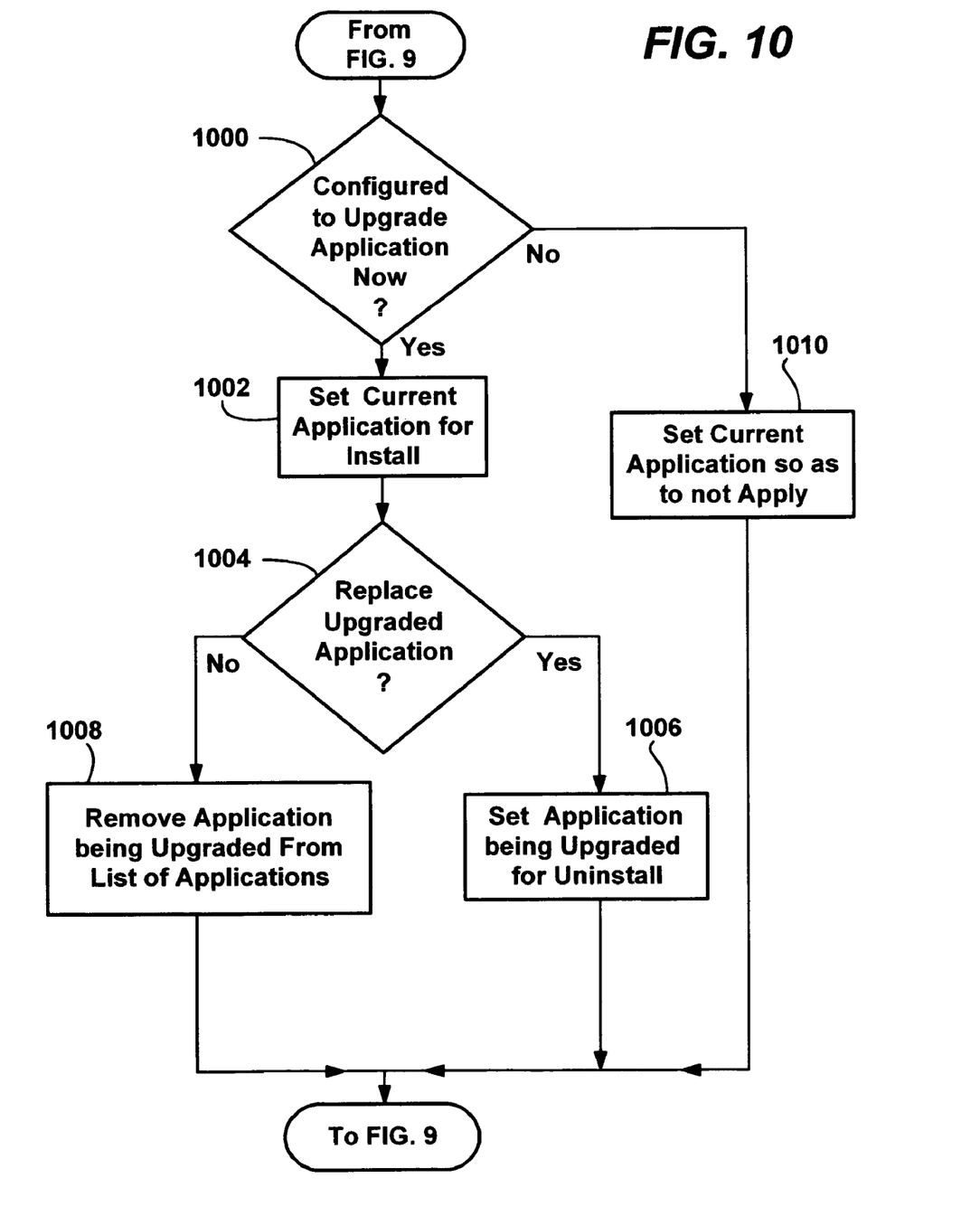

Turning now to an explanation of the operation of the present invention with particular reference to the flow diagrams of FIGS. 8-10, FIG. 8 shows general preprocessing steps for determining which applications to apply to a user or machine. As described above, the applications that may be applied to a user or machine are those that are assigned thereto, along with those applications published to a user that the user has selected. For purposes of simplicity, the present invention will be described herein with respect to applications being deployed to a user at logon time, however as can be appreciated, the present invention is similarly applicable to applications deployed to machines, such as when the machine reboots and connects to the network. In any event, step 800 selects an application from the policy object's 62 (FIG. 6) list of such managed applications maintained in the class store 64 in accordance with the user's group. Step 802 then checks to see if the application is assigned to the user, i.e., the group policy 82 deems it mandatory for that user. If so, step 802 branches to step 808 where the application (e.g., a property thereof) is marked so that the application will be one applied to the user as appropriate.

If not assigned, step 802 instead branches to step 804 where the machine's state information 114 (FIG. 6) is evaluated to see if the user has previously selected it. Note that the application is either published or assigned, otherwise it should not be among the applications listed under the user's group policy or policies 62. Applications that are published and have been previously selected are similar to those that are assigned, (except that as described above, the user can optionally remove such an application, which effectively deselects the application). Thus, for applications published and selected, step 804 branches to step 808 to mark the application for applying to the user. For published applications that have never been selected or that have been deselected, step 804 branches to step 806 where the application is marked (if necessary) so as to not apply it. Note that instead of marking the applications, effectively generating the list 116, it is alternatively feasible to add only the applications to apply to a new list, i.e., the list 116 can be a separate list. In any event, the steps of FIG. 8 are preliminary steps, which, although not necessary to the present invention, identify a set of possible applications to consider applying to the user.

When the list of applications has been processed as determined at step 810, FIG. 8 continues to FIGS. 9 and 10 which may modify the applications the user ultimately receives based on any precedence (upgrade) relationships between the applications in accordance with one aspect of the present invention. Note that as used herein, the term "upgrade" does not necessarily correspond to changing to a more recent version of the same application, (although such an upgrade would be typical). For example, an administrator may select one manufacturer's application program over that of another manufacturer. Similarly, an older version of a program may be put back into use, such as if the newer version failed to appropriately perform, whereby the older version would be an "upgrade" to the newer version. Indeed, a program need not upgrade the same type of program or programs, e.g., a word processor with spreadsheet capabilities could upgrade both an existing word processor application and a spreadsheet application.

To handle the precedence relationships, step 900 of FIG. 9 selects (initially, the first) application in the list that is to be potentially applied, as the current selected application. Step 902 then determines, by evaluating properties stored with the applications as described above, if this application is an upgrade. If not, step 904 branches to step 910, which continues the process by returning to step 900 to select the next application and so on until no more applications remain in the list. However, if at step 902 the application is an upgrade, step 902 branches to step 904 to select an application that is to be upgraded by the current application, as listed in the properties therefor. Note that an application may upgrade more than one application that would otherwise be deployed to a user.

Step 906 then examines the state of the machine along with the application's properties to determine if it is currently installed for a user or set to be installed. Note that one application may be processed before an application that upgrades it is processed, and thus it may be already set for install (via step 1002, described below). Further, note that as described above, an application that is available to a user may be advertised to the user, but not yet installed. In this type of configuration, installation only takes place when needed, on demand, whereby among other benefits, the load on the server is distributed and the local machine's resources not burdened with unused application programs. If the application is neither installed nor is set to be installed, there is nothing to upgrade, and step 906 branches to step 908 to determine if another application is to be upgraded. If so, step 908 returns to step 904 to evaluate the next application to be upgraded, otherwise step 908 branches to step 910 to test if another application is in the list, as described above.

If at step 906 the application to be upgraded is currently installed or set to be installed, step 906 branches to step 1000 of FIG. 10. Step 1000 tests to determine if the application is to be upgraded now, i.e., presently, as part of this user logon. An upgrade takes place presently if either it is mandatory, (as opposed to optional), or if the user has requested it now, such as by having clicked on a file with an appropriate extension, or via an Install Programs applet. Note that if the user is requesting to upgrade to an optional application, (e.g., via the applet) the upgrade/installation does not wait until the next logon time, however, it is essentially the same as upgrading at logon, but having only one application in the list to apply. If the upgrade is not mandatory or being requested by the user, step 1000 branches to step 1010 which sets the current application so as to not apply, and then returns to step 908 of FIG. 9. Step 1000 thus enables an administrator to distinguish between forced upgrades and optional upgrades, i.e., if the upgrading application is not set to upgrade now, then at step 1010 it is configured to not apply.

However, if the upgrade is to take place presently, step 1000 continues to step 1002 where the current (upgrade) application is set to be installed. Again, it should be noted that this will advertise the application, however the physical installation itself may or may not take place until the user first selects that application, depending on the administrator's choice. Step 1002 continues to step 1004 where the overlay/replace property of the application is evaluated, to determine if it can be overwritten by the upgrade or needs to be removed, as described above. For applications that need to be replaced rather than overlaid, step 1004 branches to step 1006 where the application to be upgraded is marked for uninstalling. The uninstall may take place prior to installing the upgrade, which may be deferred as described above. Otherwise, step 1008 removes the application that is being upgraded from the list of applications 118, before returning to step 906 of FIG. 9.

Once the upgrade process steps of FIGS. 9 and 10 are completed, the precedence relationships result in a set of applications to advertise to the user and possibly to uninstall, as essentially configured in the list 118 of FIG. 6. The list 118 is compared against the actual state of the machine, and those applications set for install or already installed are advertised to the user as being available. The installs and uninstalls may take place immediately, or be deferred as described above. If deferred, the installs and uninstalls may wait for a user selection of the application, i.e., if the user selects an application that is not installed on the machine, any corresponding application marked for uninstall will be uninstalled, and the selected upgraded application will be installed on demand. Note that uninstall and/or install operations may be performed independent of user selection, such as during machine idle times and/or periods of low network demand. For example, an upgrade to a large group of users, of a frequently used application such as a word processing program, can be performed to automatically install on a given weekend. This would prevent the network from becoming overburdened on Monday morning from too many installations, since many users are likely to first select the upgraded application at approximately the same time.

As can be seen from the foregoing detailed description, there is provided a method and system that provide for managing precedence relationships between applications deployed in a network. The method and system are flexible, extensible and fit into an existing application deployment architecture to facilitate the management of deployed applications.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer network including at least one client, a method performed by a processor in a computer comprising:
   maintaining a plurality of group policies corresponding to groups of which the client is a member, each policy specifying a plurality of software implementations that are available to be deployed to the client;
   receiving input that specifies precedence information indicative of precedence relationships among the plurality of software implementations of each group;
   selecting one of the group policies to apply to the client;
   selecting a software implementation from the selected group; and
   determining from the precedence information whether the selected software implementation has precedence over at least one other software implementation in the selected group, and if so, setting the selected software implementation for deployment and deselecting the at least one other software implementation so that the at least one other software implementation is not deployed to the client.

2. The method of claim 1 wherein setting the selected software implementation for deployment comprises setting the selected software implementation for install.

3. The method of claim 2 wherein setting the selected software implementation for install comprises including the selected software implementation in a list of software implementations to install, and further comprising, installing the selected software implementation.

4. The method of claim 1 further comprising advertising the selected software implementation as available to the user for execution on a computer system prior to actual installation of the software implementation on the computer system.

5. The method of claim 1 wherein the at least one software implementation is already installed on the client, and wherein deselecting the at least one software implementation comprises setting the at least one other software implementation for uninstall, and uninstalling the at least one other software implementation.

6. The method of claim 1 wherein deselecting the at least one software implementation comprises removing the at least one other software implementation from the set of software implementations to deploy.

7. The method of claim 1 wherein the precedence information indicative of precedence relationships between software implementations is maintained in a class store of the network, and wherein the class store is associated with a group policy object provided for the client.

8. The method of claim 1 wherein the precedence information indicative of precedence relationships between software implementations includes a value indicative of whether to replace or overlay another software implementation.

9. The method of claim 1 wherein the client corresponds to a user, and wherein selecting a software implementation automatically occurs as part of a user logon or in response to a user request.

10. The method of claim 1 wherein the client corresponds to a machine, and wherein selecting a software implementation automatically occurs when the machine connects to the network.

11. A computer-readable medium storing computer-executable instructions for performing the method of claim 1.

12. In a computer network, a system comprising:
   a processor and memory storing computer executable instructions which when executed by the processor perform a method comprising:
      maintaining policy information specifying a first software implementation for deployment to a first group of clients;
      maintaining policy information specifying a second software implementation for deployment to a second group of clients;
      maintaining precedence information specifying a precedence relationship between the first and second software implementations;
      accessing the precedence information to determine whether the first software implementation or second software implementation has precedence for deployment to a client that belongs to both the first group of clients and the second group of clients; and selecting, as a selected software implementation for deployment to the client, the software implementation that is determined to have precedence such that the software implementation that is not selected is not deployed to the client.

13. The system of claim 12 further comprising advertising the selected software implementation as available to the user for execution on the client prior to actual installation of the software implementation on the client.

14. The system of claim 12 further comprising, setting the second software implementation for uninstall when the first software implementation has precedence over the second software implementation.

15. The system of claim 12 further comprising specifying the precedence information for a pilot group of clients that is small relative to a total number of clients of the network, and specifying the precedence information for a rollout group of clients that is relatively larger than the pilot group and smaller than the total number of clients of the network.

16. The system of claim 12 wherein the policy information specifying the first software implementation for deployment to a first group of clients is associated with at least one group policy object.

17. The system of claim 12 wherein the policy information specifying the first software implementation is associated with a first policy set, wherein the policy information specifying the second software implementation is associated with a second policy set, wherein accessing the precedence information includes:

evaluating the first and second sets to compare information therein against state information of a machine corresponding to the client, to determine a list of at least two applications that are potentially available to the client, and wherein selecting includes:

processing the list based on the precedence information to determine whether to set at least one of the applications for install or uninstall.

* * * * *

UNITED STATES PATENT AND TRADEMARK OFFICE
CERTIFICATE OF CORRECTION

PATENT NO. : 7,779,406 B2  Page 1 of 1
APPLICATION NO. : 11/441746
DATED : August 17, 2010
INVENTOR(S) : Stephen M. Blanding et al.

It is certified that error appears in the above-identified patent and that said Letters Patent is hereby corrected as shown below:

In column 1, lines 8-9, delete "continuation of copending U.S. patent application Ser. No. 09/293,326, filed Apr. 16, 1999." and insert -- continuation of U.S. patent application Ser. No. 09/293,326, filed Apr. 16, 1999, now abandoned. --, therefor.

Signed and Sealed this
Twenty-fifth Day of January, 2011

David J. Kappos
*Director of the United States Patent and Trademark Office*